United States Patent
Santa Cruz

[11] Patent Number: 5,450,816
[45] Date of Patent: Sep. 19, 1995

[54] FREE-STANDING HUMMINGBIRD FEEDER

[76] Inventor: Tonya A. Santa Cruz, 2328 Lucretia Ave. #2, San Jose, Calif. 95122

[21] Appl. No.: 291,482

[22] Filed: Aug. 17, 1994

[51] Int. Cl.$^6$ .............................................. A01K 39/02
[52] U.S. Cl. ....................... 119/72; 119/57; 428/24
[58] Field of Search .............. 119/61, 72, 77, 69.5, 119/57.8; 47/41.13, 41.14, 41.15, 55; 428/24, 26

[56] References Cited

U.S. PATENT DOCUMENTS

| | | | |
|---|---|---|---|
| D. 95,019 | 4/1935 | Cooperstein | 47/41.13 |
| 1,562,992 | 4/1925 | Schling | 47/41.13 |
| 2,641,086 | 6/1953 | Shinoda | 47/55 |
| 2,887,988 | 5/1959 | Cottongim | 119/69.5 |
| 3,108,401 | 10/1963 | Richardson | 47/41.13 |
| 3,301,220 | 1/1967 | Queen | 119/77 |
| 3,913,527 | 10/1975 | Kilham | 119/51 R |
| 3,928,936 | 12/1975 | Wollen | 47/41.15 |
| 4,037,361 | 7/1977 | Murphy et al. | 47/55 |
| 4,708,892 | 11/1987 | Young et al. | 482/24 |
| 4,938,168 | 7/1990 | Meidell | 119/77 |
| 5,125,069 | 6/1992 | Fowler | 119/77 |
| 5,247,904 | 9/1993 | Anderson | 119/72 |

FOREIGN PATENT DOCUMENTS

| | | | |
|---|---|---|---|
| 636898 | 4/1928 | European Pat. Off. | 428/24 |
| 1157567 | 5/1958 | France | 47/41.3 |
| 142192 | 11/1930 | Switzerland | 47/11.3 |

Primary Examiner—Todd E. Manahan
Attorney, Agent, or Firm—Henderson & Sturm

[57] ABSTRACT

A hummingbird feeder includes a flower member having a limited capacity fluid chamber associated with an angled hollow tubular calyx portion which is dimensioned to receive the upper end of a tubular support member. The limited capacity of the fluid chamber will tend to prevent the spoilage of the sugar solution that is introduced into the fluid chamber.

5 Claims, 1 Drawing Sheet

U.S. Patent  Sep. 19, 1995  5,450,816
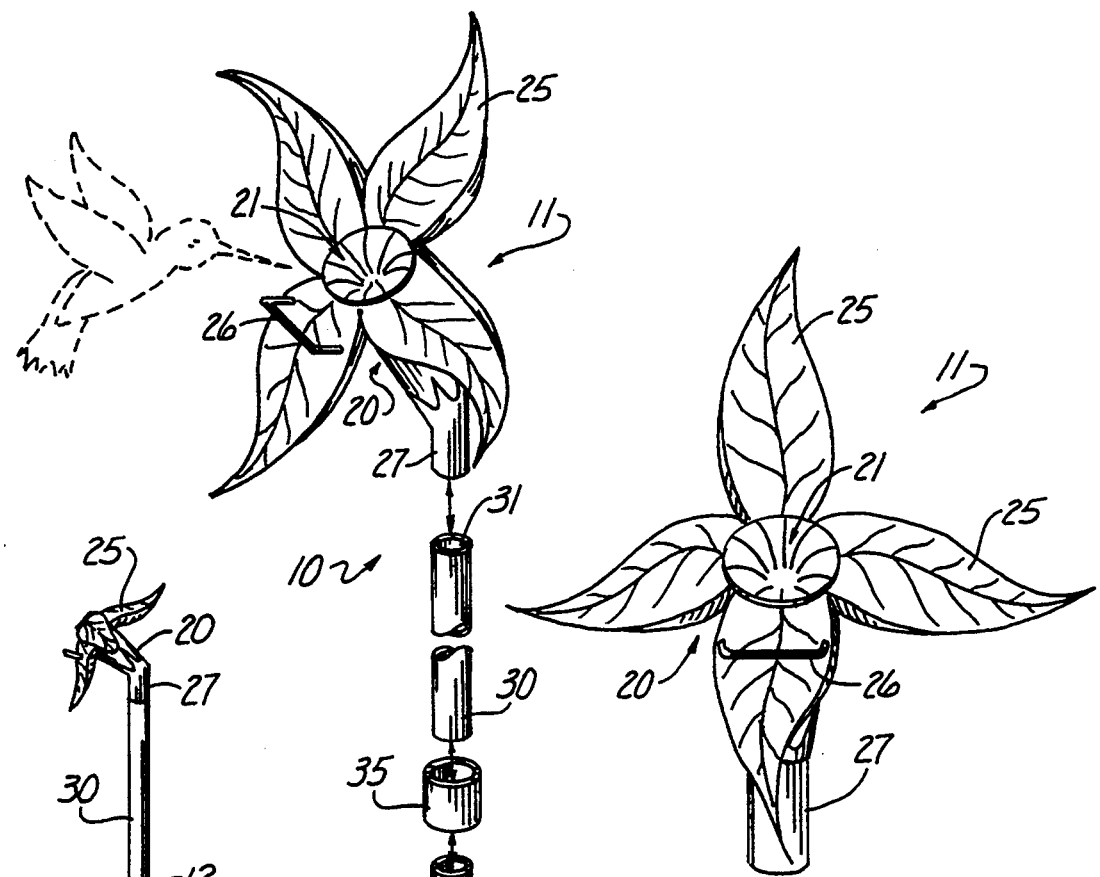
Fig. 1
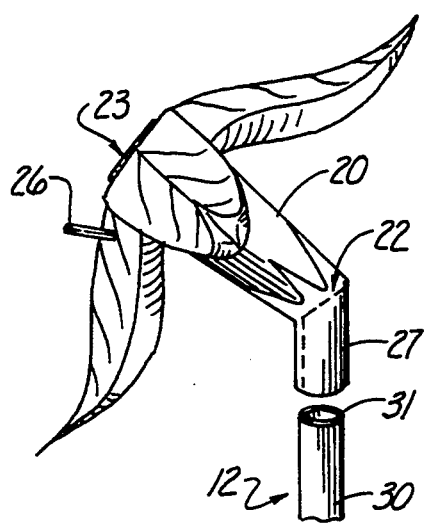
Fig. 2
Fig. 3
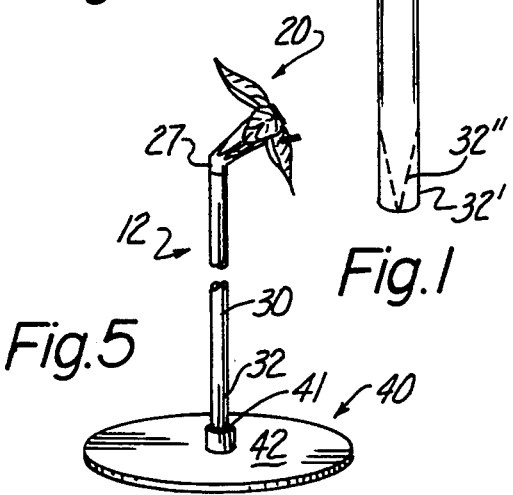
Fig. 4
Fig. 5

FREE-STANDING HUMMINGBIRD FEEDER

TECHNICAL FIELD

This present invention relates to the field of bird feeders in general, and in particular, to a free-standing hummingbird feeder.

BACKGROUND ART

This invention was the subject matter of Document Disclosure Program Registration No. 339469 which was filed in the United States Patent and Trademark Office on Sep. 20, 1993.

As can be seen by reference to the following U.S. Pat. Nos. 3,301,220; 3,913,527; 4,938,168; and 5,247,904; the prior art is replete with myriad and diverse hummingbird feeders.

While all of the aforementioned prior art constructions are more than adequate for the basic purpose and function for which they have been specifically designed, these hummingbird feeders generally need to be hung from an overhead support, have an unnatural appearance, and are relatively difficult to fill. In addition, these device usually hold large quantities of sugar solution, which can spoil causing intestinal problems for the hummingbirds.

As a consequence of the foregoing situation, there has existed a longstanding need for a hummingbird feeder that is free-standing, is easy to fill, holds a small quantity of sugar solution, and has a natural, aesthetic appearance; and the provision of such a construction is a stated objective of the present invention.

DISCLOSURE OF THE INVENTION

Briefly stated, the hummingbird feeder that forms the basis of the present invention was developed to provide a free-standing structure for retaining and presenting a limited amount of sugar solutions for consumption by hummingbirds.

In addition, the feeder is specifically designed to prevent the spoilage of the sugar solution by making the reservoir as small as possible to provide at most, one or two days supply of solution.

Another object of the present invention is to provide a hummingbird feeder with a natural and aesthetic appearance.

The present invention comprises in general: a feeder unit and a support unit; whereby the feeder unit comprises a flower member, including a discrete, fluted fluid chamber intended for holding a limited quantity of sugar solution for feeding hummingbirds. In addition, the feeder member includes a plurality of decorative petals radially deployed around the fluid chamber, and a perch element provided on one of the lower petals.

The support unit comprises a generally tubular stem member and a base member.

As will be explained in greater detail further on in the specification, when an individual wishes to install a hummingbird feeder, all that is necessary is for the individual to connect the stem member to the base member and the flower member, set the feeder in the desired location, and pour sugar solution into the flower chamber.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is an exploded perspective view of the flower and stem portions of the present invention;

FIG. 2 is a front plan view of the flower section;

FIG. 3 is a side plan view of the flower section;

FIG. 4 is a side plan view of an alternative embodiment of the stem and base; and FIG. 5 is a side perspective view of the assembled free-standing hummingbird feeder.

BEST MODE FOR CARRYING OUT THE INVENTION

As can be seen by reference to the drawings, and in particular to FIG. 1, the free-standing hummingbird feeder that forms the basis of the present invention is designated generally by the reference numeral (10).

As shown in FIGS. 1, 4 and 5, the feeder (10) comprises in general a feeder unit (11) and a support unit (12). These units will now be described in seriatim fashion.

As can best be seen by reference to FIGS. 1 through 3, the feeder unit (11) comprises a flower member (20), including a discrete fluted fluid chamber (21) having a closed lower end (22) and an enlarged open upper end (23).

In addition, the upper end (23) of the flower member (20) is provided with a plurality of petal elements (25) which are radially arrayed around the pistil element; and one of the lower petal elements (25) is provided with a perch element (26) which will allow a hummingbird to rest while sipping sugar solution out of the fluid chamber (21).

As can be seen in particular by reference to FIG. 3, the flower member (20) also includes an angled hollow tubular calyx portion (27) whose purpose and function will be described presently.

Turning now to FIGS. 1, 3 and 5, it can be seen that the support unit (12) comprises at least one elongated tubular support member (30) having an upper end (31) which is dimensioned to be received in the hollow tubular calyx portion (27) of the flower member (20); and having a lower end (32) which is dimensioned to be received in a base member (40).

In one form of the preferred embodiment depicted in FIG. 5, the support unit (12) comprises a single straight elongated tubular support member (30) whose lower end (32) is dimensioned to be received in the central hub (41) of a generally flat disc shaped base member (42).

In another form of the preferred embodiment depicted in FIG. 4, the support unit (12) comprises a single elongated tubular support member (30) having a bent lower end (32) which is dimensioned to be received in the stem (43) of a section cup base member (44); such that the feeder (10) may be mounted on a window pane (not shown) or the like.

In yet another form of the preferred embodiment depicted in FIG. 1, the support unit (12) comprises a pair of straight elongated tubular support members (30) (30') joined together by a coupling element (35); wherein, the lower tubular support member (30) may be provided with a generally flat lower end (32) for insertion into a base member (40) similar to that depicted in FIG. 5, or with a tapered end (32") for penetrating engagement with the ground, or the like.

It should also be noted at this juncture that in all versions of the preferred embodiment, the angled calyx portion (27) of the flower member (20) disposes the longitudinal axis of the fluid chamber (21) at an angle of approximately 45°, which will not only facilitate the daily refilling of the chamber (21), but which will also facilitate the entry of the hummingbirds beak into the chamber (21).

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

I claim:

1. A hummingbird feeder comprising:
    a feeder unit comprising a flower member, including:
        a discrete volume fluted fluid chamber having an enlarged open upper end, a closed lower end and a longitudinal axis; and an angled hollow tubular calyx portion extending downwardly from the closed lower end of said fluid chamber; wherein, the flower member further includes a plurality of petal elements radially arrayed around the upper end of said fluid chamber and a perch element operatively associated with one of said plurality of petal elements; and
    a support unit, including at least one elongated tubular support member having an upper end which is dimensioned to be received in the calyx portion of said flower member.

2. The feeder as in claim 1; wherein, the support unit further includes:
    a base member dimensioned to receive the lower end of said at least one elongated tubular support member.

3. The feeder as in claim 2; wherein, the said at least one elongated tubular support member is straight, and the base member comprises an enlarged flat disk having a central hub dimensioned to receive the said lower end.

4. The feeder as in claim 2; wherein, the said at least one elongated tubular support member has a bent lower end, and the base member comprises a suction cup having a hollow stem which is dimensioned to receive the said lower end.

5. A hummingbird feeder comprising:
    a feeder unit comprising a flower member, including:
        a discrete volume fluted fluid chamber having an enlarged open upper end, a closed lower end and a longitudinal axis; and an angled hollow tubular calyx portion extending downwardly from the closed lower end of said fluid chamber;
    a support unit, including at least one elongated tubular support member having an upper end which is dimensioned to be received in the calyx portion of said flower member; and,
    a base member dimensioned to receive the lower end of said at least one elongated tubular support member; wherein, the said at least one elongated tubular support member has a bent lower end, and the base member comprises a suction cup having a hollow stem which is dimensioned to receive the said lower end.

* * * * *